R. C. SIMMONS.
HEEL BUILDING MACHINE.
APPLICATION FILED MAR. 1, 1916.

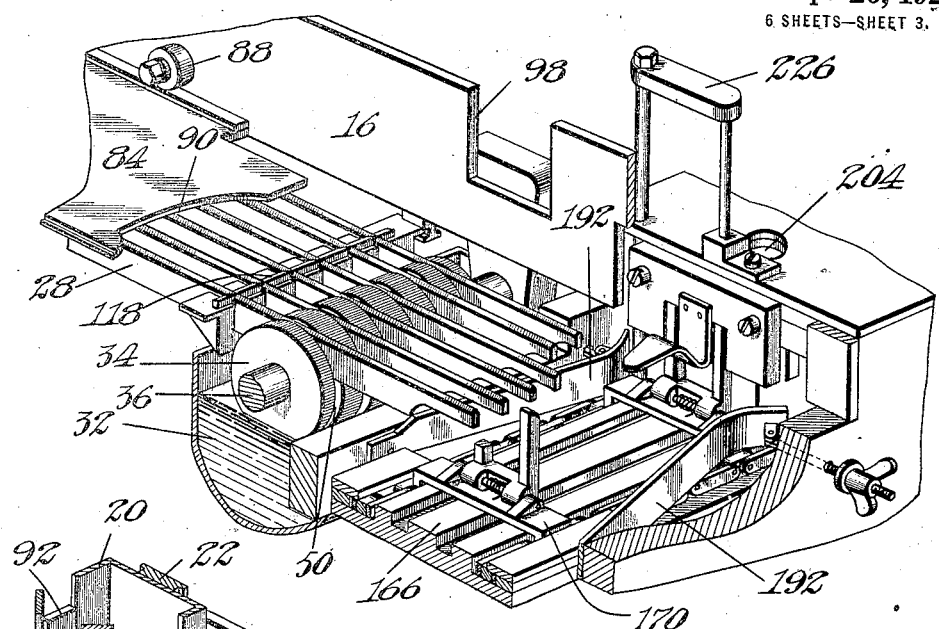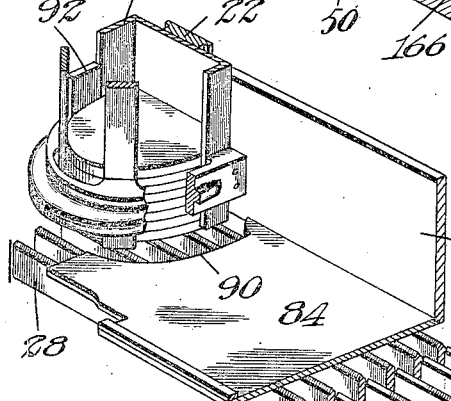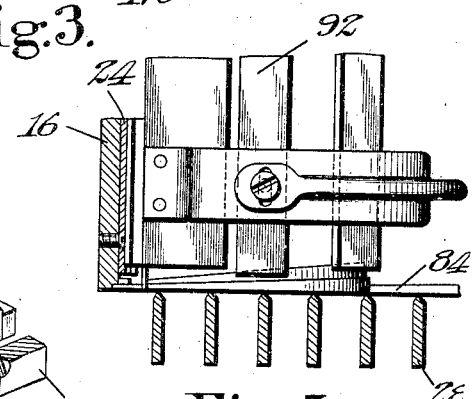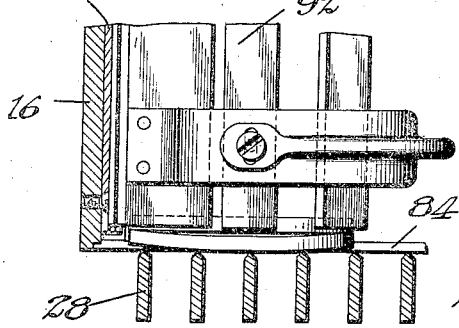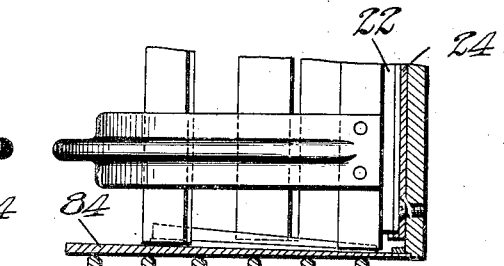

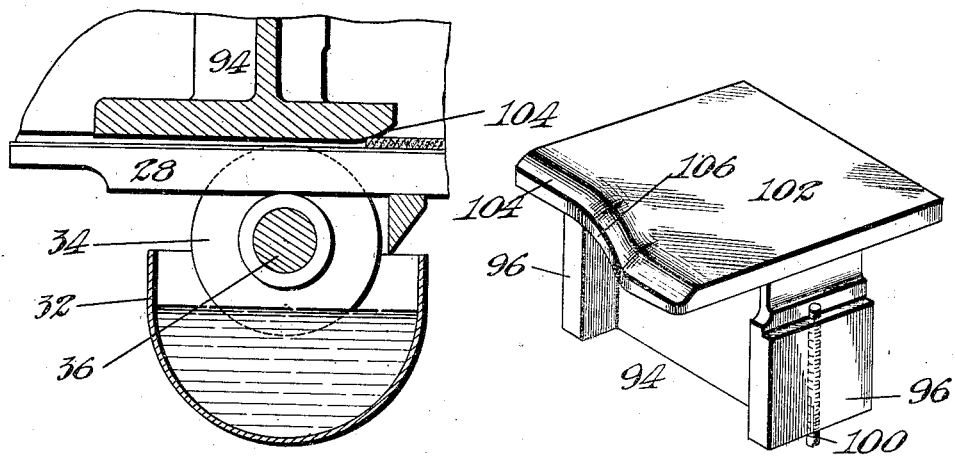
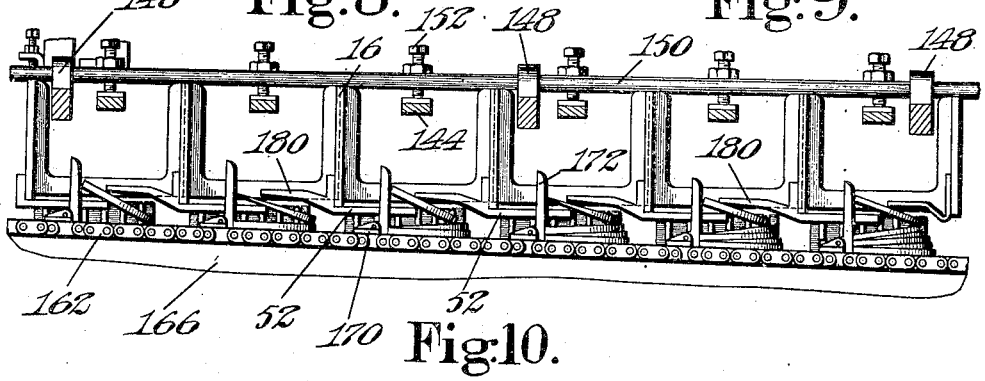
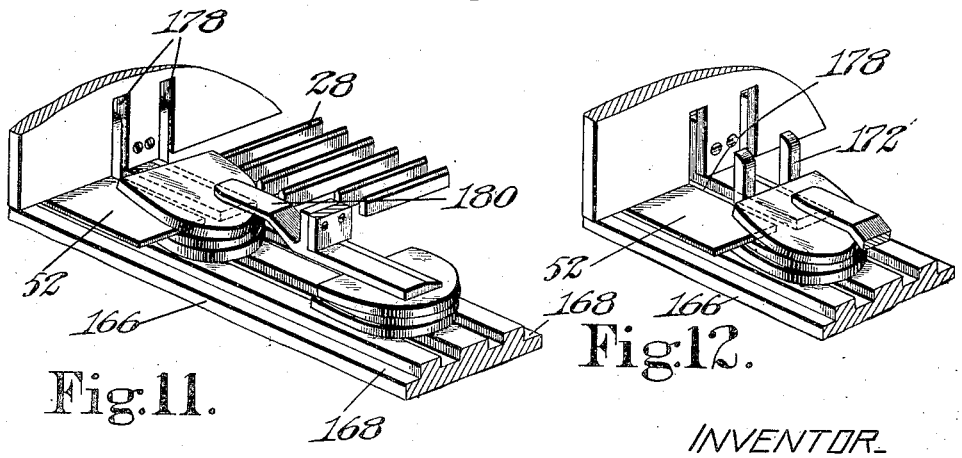

1,430,032.

Patented Sept. 26, 1922.
6 SHEETS—SHEET 5.

INVENTOR

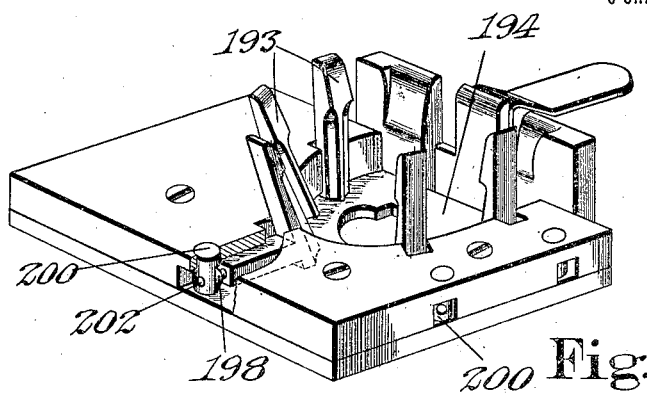
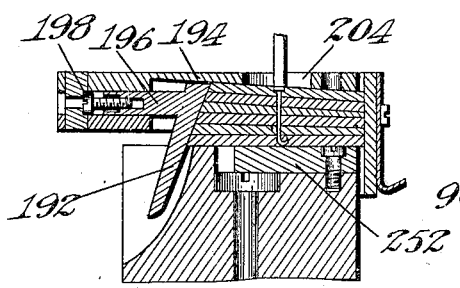
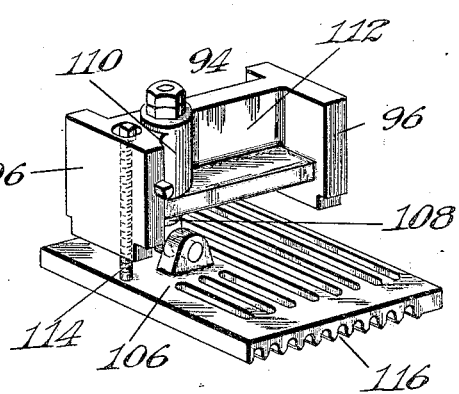
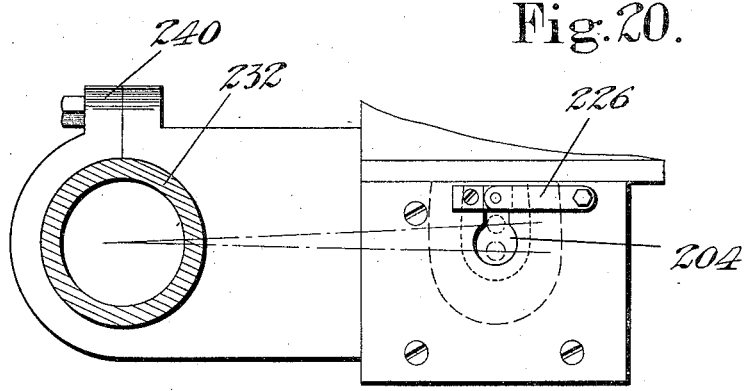

Patented Sept. 26, 1922.

1,430,032

UNITED STATES PATENT OFFICE.

RALPH C. SIMMONS, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

HEEL-BUILDING MACHINE.

Application filed March 1, 1916. Serial No. 81,405.

*To all whom it may concern:*

Be it known that I, RALPH C. SIMMONS, a citizen of the United States, residing at Beverly, in the county of Essex and State of Massachusetts, have invented certain Improvements in Heel-Building Machines, of which the following description, in connection with the accompanying drawings, is a specification, like reference characters on the drawings indicating like parts in the several figures.

This invention relates to heel building machines in general and, in particular, to a machine for automatically collecting individual lifts and assembling them in the form of a heel blank.

Several inventors have heretofore proposed heel building machines which were intended to be more or less automatic in operation but, up to the present time, none of these machines has ever come into practical commercial use, for a variety of reasons, among which may be mentioned slowness of operation, due to complicated construction and heavy reciprocating parts, difficulty in pasting and keeping control of the various individual lifts, etc.

The object of the present invention is to provide an automatic heel building machine which can be constructed at a reasonable cost and which will combine high speed of operation with certainty and accuracy in handling the lifts, to an extent which will ensure satisfaction and economy in the use of the machine under ordinary commercial conditions.

With these ends in view, an important feature of the invention consists in the provision of means for holding a series of stacks of heel lifts, in combination with means for removing lifts from the several stacks, supporting means for receiving the lifts thus removed, and assembling means, which, in the illustrated embodiment of the invention, takes the form of an endless conveyor, for assembling lifts from the supporting means in proper register with each other to form heels. The conveyor is preferably located at one side of the series of magazines, automatic mechanism being provided for transferring the lifts from the magazines to the conveyor and suitable automatic pasting mechanism being co-operatively related to the transferring mechanism, for applying paste to the lifts in transitu between the magazines and the conveyor.

A further feature of the invention consists in the provision of a lift support, preferably comprising a series of shelves, arranged to receive a series of lifts removed from the magazines and support them in position to be collected and arranged in proper register by the lift assembling device. The construction and operation are preferably such that the lift assembling device is given a unidirectional, step by step, movement, a complete series of lifts being deposited upon the shelves between successive movements of the assembling device, whereby a plurality of heels are always being built simultaneously. The production of heels by the machine is thus very large, a completed heel being produced at every step in the movement of the assembling device.

A further feature of the invention relates to means for keeping the various lifts definitely under control at all times. In this aspect the invention includes the provision of improved means for preventing the lifts from being misplaced while they are being transferred from the magazines to assembling position, and during the process of assembling in the heel form.

In machines heretofore experimented with, disarrangement and damage has frequently resulted from the continuation of the operation of the machine after failure of one or more of the lifts to be advanced in their proper paths at the proper time. To the end that this difficulty may be eliminated, a further feature of the invention resides in the provision of improved means for automatically stopping the operation of the machine in the event of failure of the transferring mechanism to deliver any lift at the proper time.

Still further features of the invention relate to improvements in the lift pasting mechanism, the heel form in which the lifts are secured together and the heel is given its final shape, and other details which co-operate to effect increased accuracy and speed in operation and improvement in the quality of the product.

A machine embodying the various features of the invention is specifically described in the following specification and illustrated in the accompanying drawings but it should be understood that this particular embodiment of the invention has been selected merely for the purpose of making a complete disclosure of the same, and that many changes in form and detail are contemplated and can be made without departing from the spirit of the invention, the scope of which is to be considered as limited only as defined in the appended claims.

In the drawings,

Figs. 3, 4, 5, 6 and 7 are views of details of the lift magazines and lift transferring mechanism;

Figs. 8 and 9 are views illustrating details of the pasting mechanism;

Figs. 10, 11, 12 and 13 illustrate details of the lift assembling mechanism;

Figs. 17 and 18 illustrate details of the heel form;

Fig. 19 is a diagrammatic representation of the manner in which the location of the nail in the heel is varied; and Fig. 20 is a perspective view of a modified form of plunger for pressing wedge lifts into engagement with the paste roll.

Figure 1:
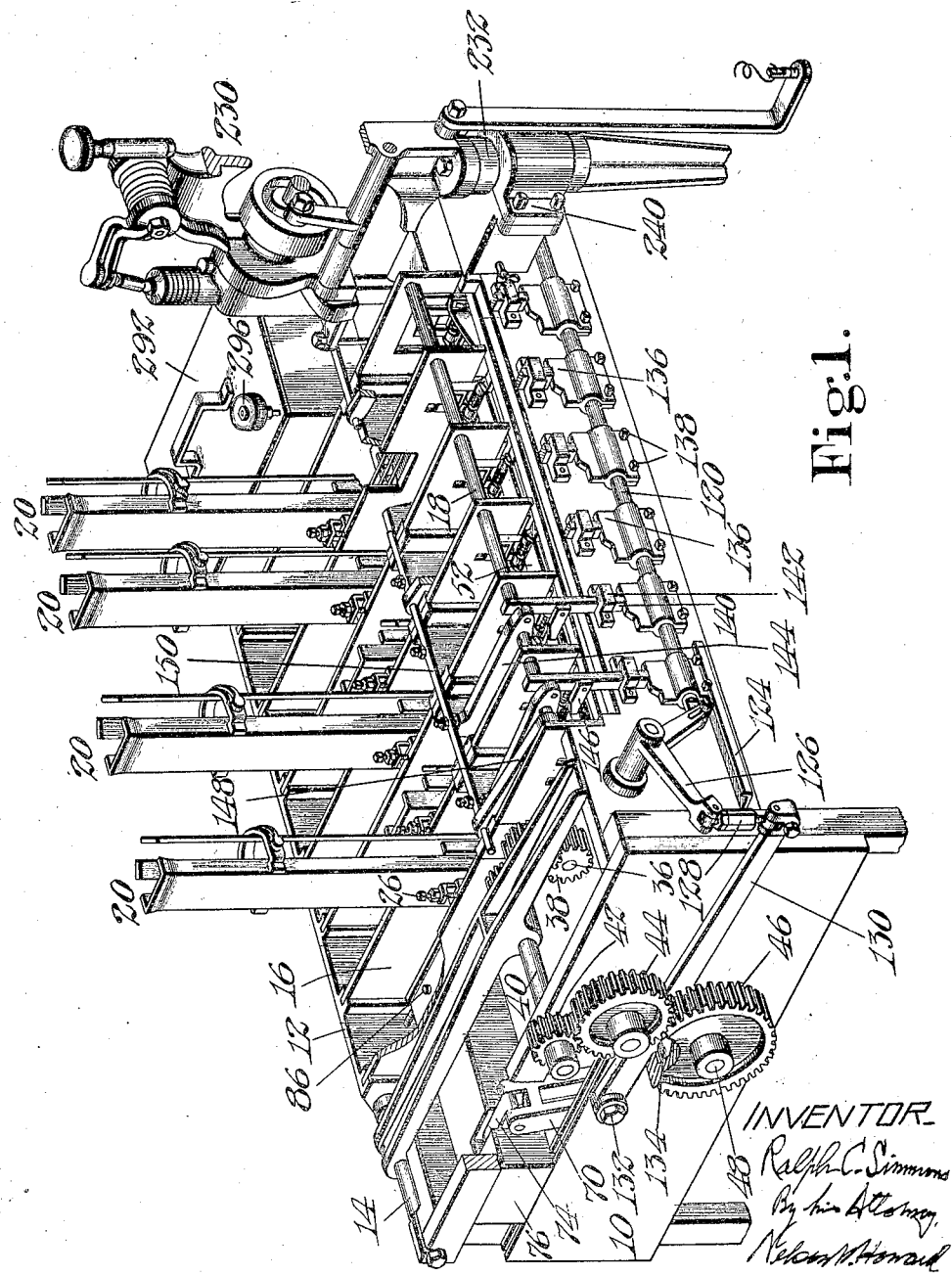
Fig. 1 is a perspective view of a heel building machine embodying the present invention, some of the parts of the machine being broken away to afford a clearer view of certain other hidden parts.

The reference numeral 10 indicates a frame in which the various operating mechanisms of the machine are mounted. An auxiliary frame 12 is pivotally connected to the main frame 10 by a rod 14 extending along the back of the machine. The construction and arrangement are such that the auxiliary frame 12 and the various devices mounted upon it may be swung vertically upwardly about the axis of the rod 14 to render the mechanism beneath easy of access for inspection, cleaning and adjustment.

The frame 12 consists essentially of a plate or casting extending along the rear of the machine and a series of parallel partitions 16 extending forwardly therefrom to afford a plurality of passageways. The front ends of the partitions 16 are rigidly held in spaced relation by a bar 18.

In the passageways between the partitions 16 are mounted a series of magazines 20 for supporting stacks of heel lifts. Each magazine has secured to it a slide 22, (see Fig. 4) which is vertically movable in a guide 24 upon the face of a partition 16. A screw 26, threaded in an angular extension of the slide 22 and bearing upon the upper edge of the partition, provides for vertical adjustment of the magazine to regulate the space between its lower end and the lift support beneath, to the thickness of a heel lift.

Beneath each magazine is located a grid made up of a plurality of parallel bars 28 having their upper edges sharpened or thin. The grid extends from one end to the other of the passageway between the partitions 16, and the sharpening of the edges of the bars 28 is for the double purpose of resisting angular movement of the lifts as they slide along the grid and avoiding, to a large extent, the smearing of the parts of the machine with paste. The rear end of each grid is provided with adjusting screws 30, operating in the frame 12, for the purpose of effecting adjustment of the grid longitudinally of the passageway of which it forms the bottom.

Extending longitudinally of the machine, near the front ends of the grids, is a paste trough 32 in which a paste roll 34, mounted upon a shaft 36, rotates. The shaft 36 is driven by gearing 38 from a counter shaft 40, which is, in turn, driven by a train of gears 42, 44, 46 from a cam shaft 48 extending longitudinally of the machine from one end to the other. The paste roll 34 is provided with a series of annular grooves 50 (see Fig. 3) of sufficient depth to accommodate the grid bars 28, so that the intermediate sections of the roll pass between the said bars, bringing up the paste slightly above the plane of their upper edges.

A lift support comprising a series of stationary shelves 52, mounted upon the partitions 16 is located adjacent to the front ends of the grids; and lift transferring mechanism, which will now be described, is provided for the purpose of transferring lifts from the magazines, along the grids, over the paste roll, and depositing them upon the shelves.

A main drive shaft 53 is mounted in bearings 54, 56 at one end of the machine and is driven by a pulley 58 through a clutch 60, the mechanism for controlling which will be described later. A worm 62 upon the shaft 53 meshes with a worm wheel 64 upon the cam shaft 48. Cams 66 upon the cam shaft 48 are arranged to engage cam rolls 68 mounted in cam levers 70 mounted for pivotal movement upon a stationary rod 72. The cam levers 70 are connected by links 74 to a slide 76, guided in the frame 10 to reciprocate forwardly and rearwardly of the machine. The slide 76 is connected by bands 78, passing over idler pulleys 80, to a weight 82, extending lengthwise of the machine. The weight 82 acts to keep the cam rolls 68 at all times in engagement with the cams 66.

The means for engaging and transferring the lifts from the magazines to the shelves 52 comprises a series of slides or pushers 84 guided to reciprocate along the grids 28 in the passageways between the partitions 16. The rear end of each pusher is provided with a hole to drop over a pin 86 in the slide 76, and rolls 88 upon the partitions 16 serve to hold the pushers down upon the grids. When the pushers are at the rearward limit of their movement, however, they have passed out from beneath the rolls 88 so that any individual pusher may be lifted off its pin 86 and easily removed from the machine.

The forward ends of the pushers 84 are shaped, as shown at 90, to conform approximately to the shape of the edge of a heel lift, and the extent of movement of the slide 76 and the series of pushers 84, actuated by it, is such that, when the slide is retracted, the forward ends of the pushers are a short distance back of the magazines, as is clearly apparent from Fig. 4 which shows a view of a magazine from the rear; and when the slide is advanced, the pusher is moved forward to a position where the lifts engaged by the forward ends of the pushers are deposited upon the shelves 52.

By means of the adjusting screws 26 the magazines 20 may be adjusted into such spaced relation to the grids 28 that the lower lift in each magazine, when engaged by the corresponding pusher, will be removed from the magazine and slid along the grid, while the remaining superposed lifts are retained in the magazine. An independently adjustable finger 92 (see Figs. 5 and 6) is provided to permit such adjustment to be made that curled or wedge shaped lifts will be delivered from the magazines one at a time, and certain of the magazines may be quite short, as shown in Fig. 1, since it is impractical to pile up a high stack of wedge lifts in a straight pile. The pushers for the wedge lifts preferably have a wedge shaped cross section, as shown in Figs 5 and 7, thus insuring greater certainty in withdrawing the wedge lifts singly from the magazines.

After the bottom lift is ejected from a magazine by a pusher 84, it is moved along the grid 28 over the rotating paste roll 34 where it receives upon its under side a coating of paste or other suitable adhesive. In order to insure accurate feeding of the lifts and a uniform coating of paste, means is provided for flattening the lifts and holding them in engagement with the paste roll as they pass over it. A weight 94, shown inverted in Fig. 9, is provided with lateral projections 96 fitted to slide vertically in notches 98 in the partitions 16. Adjustable stop screws 100, bearing upon the bottoms of the notches 98, provide for adjusting the lower limit of movement of the weights. The lower face 102 of each weight is flat and is chamfered off at the edge first engaged by the advancing lift, to permit the lift to enter easily under the weight, as clearly shown in Fig. 8. The stop screws 100 are so adjusted that the space between the weight 94 and the grid 28 is less than the thickness of a lift, so that when the advancing lift enters under the weight the latter is raised slightly and bears upon the upper face of the lift, flattening the lift and causing its entire lower face to engage the paste roll. The rear edge of the weight is also shaped as shown at 106 to a form of approximately the curvature of the advancing edge of a lift, in order to eliminate any tendency toward angular displacement of the lift when it enters under the weight.

In Fig. 20 a special form of weight for use in connection with wedge lifts is shown. Here a plate 106, designed to engage the upper face of the lift, is pivoted to a plunger 108 which is vertically slidable in a housing 110 formed in the heavy portion 112 of the weight. The lower end of a screw 114, threaded in the portion 112, bears upon the plate 106 to press the latter downwardly, while the pivotal and sliding connection between the plate 106 and the portion 112 permits relative angular movement between the two, allowing the plate to conform to wedge lifts of various angles. The lower face of the plate 106 is also corrugated, as shown at 116, to still further minimize the probability of the lift being angularly displaced horizontally and to avoid the accumulation of paste upon said face.

As the lifts are advanced past the paste roll, the lower faces of the pushers come into contact with the roll and receive more or less paste. In order to prevent this paste from being carried back and being distributed through the machine, scrapers 118 are provided back of the paste roll, see Fig. 3, to remove the paste from the lower faces of the pushers when they are retracted.

When the slide 76 is moved forward the entire series of pushers 84 is simultaneously advanced, a series of lifts being removed from the respective magazines, transferred over the paste roll and deposited upon the lift support, which is herein shown as comprising the series of shelves 52, one for each magazine. By reason of excess paste, there is sometimes a tendency for a lift to stick to the end of a pusher and be partially retracted when the pusher retreats. To prevent disarrangement of the lifts under these circumstances, I have provided means for engaging the pasted lift and holding it upon the lift support until the pusher is separated from it. This means will now be described.

A horizontally reciprocable cam rod 120 is guided for sliding movement, at one end in the frame 10 at 122, and at the other end upon a horizontal guide plate 124. A reciprocating movement is imparted to the cam rod by a bell crank lever 126, connected by an adjustable link 128 to a cam lever 130, which is pivotally mounted upon the frame 10 at 132. The cam lever 130 is actuated by a cam 134 upon the inner face of the gear 46 and, as the cam lever oscillates, a reciprocating movement is imparted to the cam rod 120. A series of cams 136 are mounted upon the rod 120, being secured in any desired position of adjustment, longitudinally, by clamping screws 138. Each cam 136 engages a vertical slide 140, guided at its lower end in a keeper 142, and connected at its upper end to a lever 144. The levers 144 are all fulcrumed upon the spacing bar 18. Each slide 140 has secured to it a lateral finger 146, extending into one of the passageways between the partitions 16 and above one of the shelves 52. The reciprocations of the cam rod 120 are so timed, relatively to the movement of the pushers 84, that the slides 140 are elevated by the cams 136 at the time when the pushers deliver a series of lifts upon the shelves 52. Before the pushers are retracted, however, the cams 136 are moved toward the right, as seen in Fig. 1, allowing the slides 140 to descend until the fingers 146 engage the lifts upon the shelves 52, holding them in position until the pushers are separated from them. Any tendency of the lifts to adhere to the pushers and become disarranged is thus overcome.

I have provided improved mechanism for removing the lifts from the shelves 52 and assembling them into the form of a heel blank. An endless conveyor, comprising a pair of chains 162 running over sprocket wheels 164, is guided for movement along an inclined assembling table 166, located below the shelves 52. The chains travel in recesses 168 in the table and carry, at intervals spaced apart equal to the spacing of the heel lift magazines, cross bars 170. A pair of lift assembling fingers 172 is pivotally mounted upon each cross bar 170, being normally held in upright position by a spring 174 which will, however, permit the fingers to yield rearwardly in case they encounter undue resistance. The lower ends of the fingers extend below the cross bar into grooves 176 in the assembling table to prevent any possibility of a lift getting wedged beneath the fingers. The partitions 16 and the shelves 52 are slotted, at 178, to permit the fingers 172 to pass through them freely. An inclined extension 180 projects rearwardly from each shelf 52 to a point above and adjacent to the forward end of the preceding shelf in such a relation to the latter that, as a lift is pushed off of a shelf by the fingers 172, it passes beneath the extension 180 and is forced to drop down upon the assembling table or upon the pile of lifts being advanced along the assembling table by the fingers, thus preventing the lifts from being accidentally turned up edgewise and interfering with the operation of the machine. The chains 162 are advanced by a step by step movement of the sprockets 164, which are secured upon a shaft 182 having also secured to it a ratchet wheel 184. The reciprocating cam rod 120 has a rack 186 formed near one end and meshing with a pinion 188 which is loosely mounted upon the shaft 182. A pawl 190, carried by the pinion 188, engages the ratchet wheel 184 and it will be clear that as the rod 120 is reciprocated an intermittent advancing movement in one direction will be imparted to the chains 162 forming a part of the lift assembling conveyor. The elements of this mechanism are so proportioned that, at each reciprocation of the rod 120, the assembling fingers 172 are moved through a distance equal to the spacing between successive lift magazines.

By reference to Fig. 10 it will be observed that, as the conveyor advances toward the right, each pair of assembling fingers 172 accumulates a pile of heel lifts of graduated sizes arranged substantially in the form of a heel blank. As each heel blank is advanced along the assembling table 166 it arrives between a pair of adjustable resilient alining devices 192, see Fig. 3, which tend to correct any fault in the register of the lifts with each other and to cause the heel to enter the heel form properly.

Referring to Fig. 17, which shows the heel form inverted in order to give a clearer view of its component parts, it will be seen that the form consists mainly of a series of fingers or side jaws 193 and a base plate 194. Each jaw has a radial shank 196, slidably mounted in the base and freely removable from its mounting inwardly of the form. The jaw is adjustably held from movement outwardly of the form by a stop screw 198, threaded into the end of the shank 196 and bearing against a plug 200 inserted in the base. A hole 202, through the plug, provides for the insertion of a screw driver to change the adjustment of the jaw. An elongated aperture 204 is formed in the base plate 194 to permit a nail to be driven into the heel to secure the lifts together. Beneath the heel form is located a plunger 206 which is guided to move vertically in the frame 10. A block 208, carried by the plunger and having grooves 210 in alinement with the grooves 176, is arranged to move upwardly between the chains 162 at the time when the conveyor is stationary after having delivered an assembled pile of heel lifts to the block. As the plunger 206 and the block carried by it rise, the pile of heel lifts is elevated and forced into the heel form. I have found that if the lifts are forced into the form by a sudden blow, any inaccuracy in the alinement of the lifts will be corrected by the lifts being relatively shifted as they engage the jaws 193 and, for the purpose of producing such a blow, the following mechanism is provided. A cam 212, mounted upon the cam shaft 48, engages a cam roll 214 in a cam lever 216 fulcrumed upon the bar 72. One end of the cam lever 216 is connected, by a link 218, to the plunger 206 and the other end carries a weight 220, the action of which is supplemented by a spring 222. The cam 212 has an abrupt drop at 224 which is so located that at the proper time the cam lever 216 is released, allowing the weight 220 and the spring 222 to elevate the plunger 206 and the block 208 abruptly in order to drive the pile of heel lifts forcibly into the form. An ejector 226, mounted upon the plunger 206, operates, upon the return stroke of the plunger, to loosen the heel from the form, causing it to fall again into the path of the assembling fingers, which now remove the heel and cause it to drop into a discharge chute 228 at the end of the machine.

Figure 2:
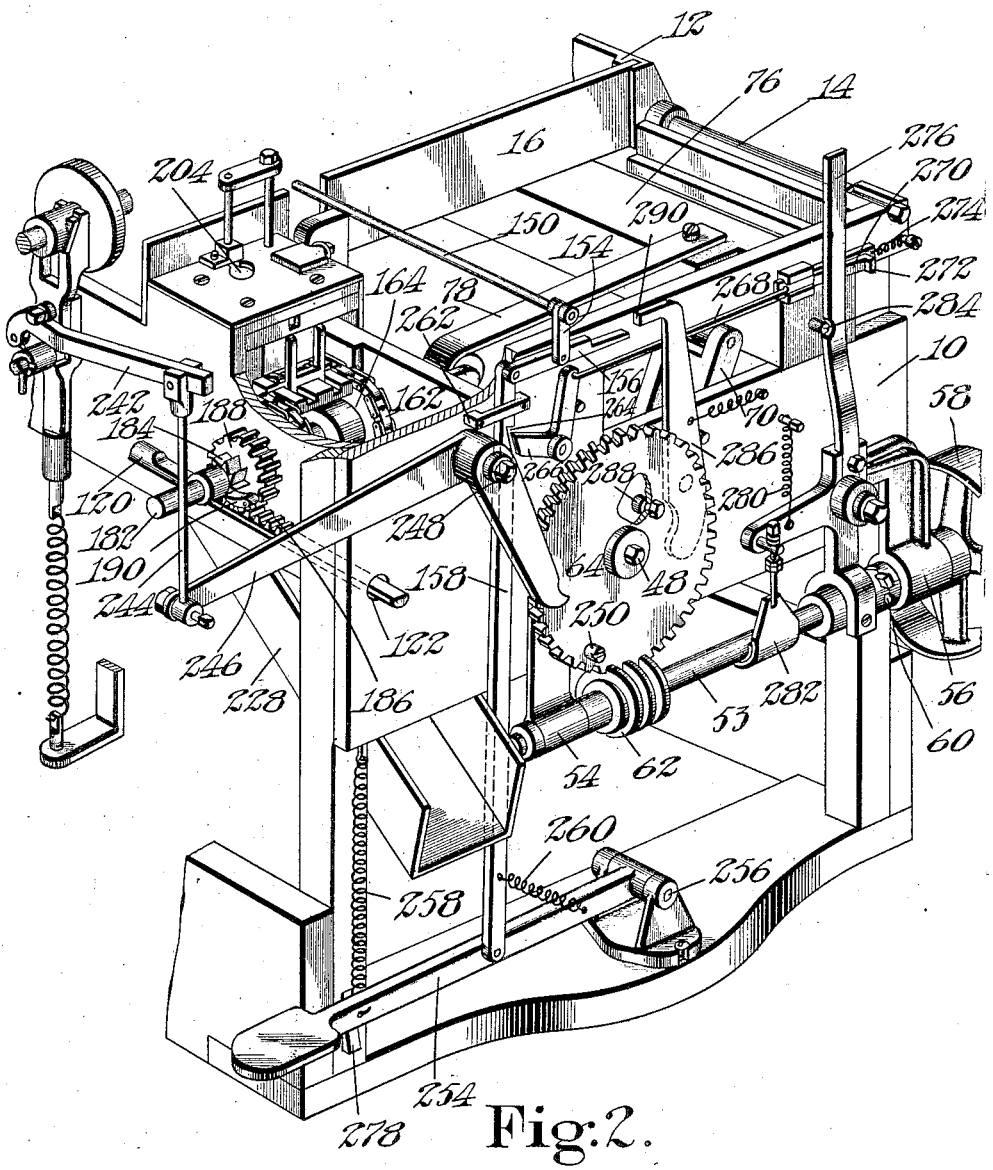
Fig. 2 is a perspective view of a portion of one end of the machine, illustrating details of the starting and stopping mechanism, and mechanism for controlling the driving of the nail.
Figure 13:
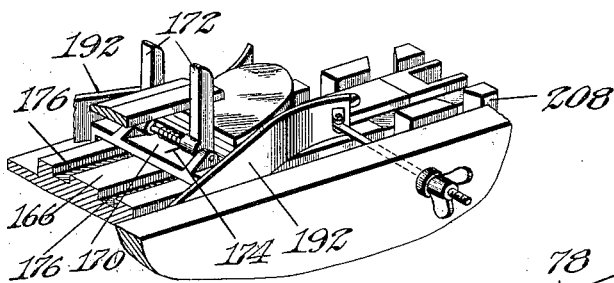
Figure 14:
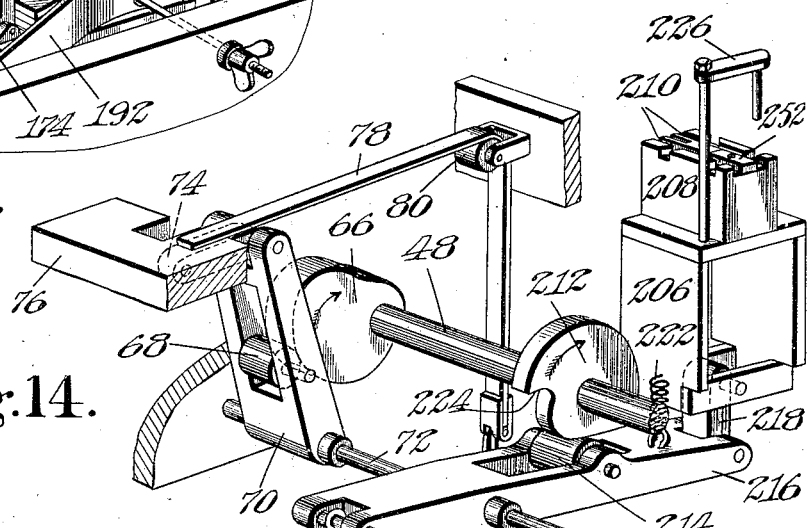
Figs. 14 and 15 illustrate details of the mechanism for forcing a heel blank into the form.
Figure 15:
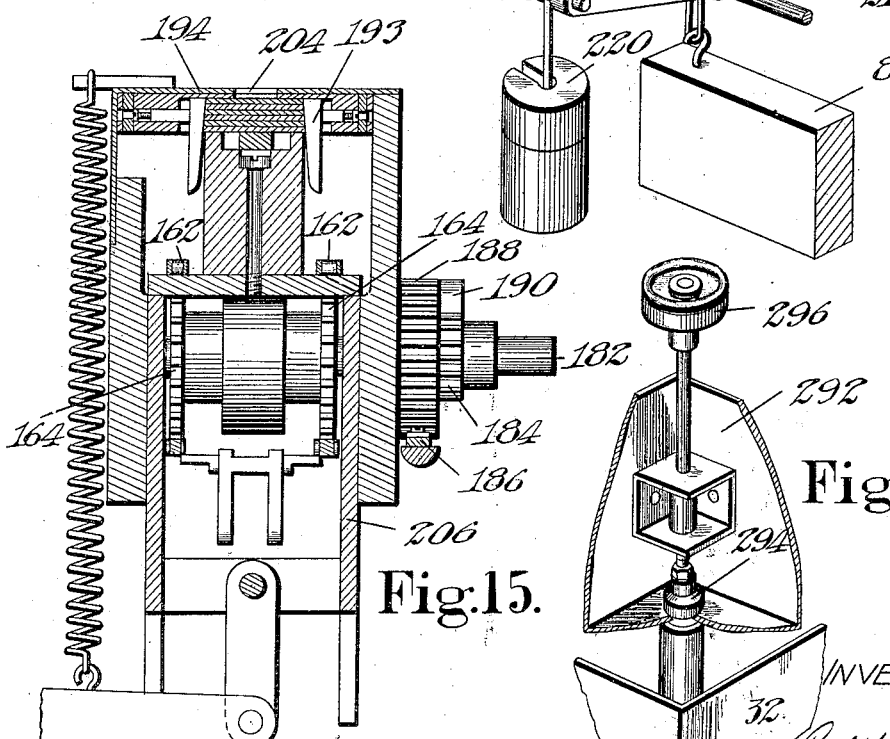

The numeral 230 indicates any suitable or desired form of nail driving mechanism, the discharge nozzle of which is located adjacent to the aperture 204. The nailing mechanism is mounted upon a column 232 secured in a clamp 240 forming a part of the frame 10. In the case of heels of widely different sizes it is desirable to change the location of the point at which the nail is to be driven, relatively to the heel form, and this may be done by loosening the clamp 240 and swinging the nail driver transversely to various positions, as indicated by the dotted lines in the diagrammatic representation of Fig. 19, where two heels of widely different sizes and two different positions of the nail are indicated. The starting of the nail driving mechanism to drive a nail is controlled by a lever 242, see Fig. 2, which is connected by a rod 244 to a bell crank lever 246 pivoted at 248 to the frame 10. The opposite end of the bell crank lever is arranged to be engaged by a pin 250, inserted in the face of the worm wheel 64, at such a point that the nailing mechanism will operate to drive a nail into, and through the heel, while the latter is held in the heel form by the block 208. The upper face of the block 208 is provided with a metal plate 252 to clinch the point of the nail, as shown in Fig. 18.

The starting and stopping of the machine is controlled by mechanism now to be described. A treadle 254 is pivoted to the base of the machine at 256 and held upwardly by a spring 258. A treadle rod 158 is pivoted to the treadle and drawn rearwardly by a spring 260. The upper end of the treadle rod is guided in a keeper 262 which permits it to oscillate forwardly and rearwardly. When the treadle rod is drawn rearwardly by the spring 260 a notch 264 engages the point of a dog 266, which is connected by a rod 268 to a sliding wedge 270 having at its rear end a projection 272. A spring 274 tends to draw the wedge 270 rearwardly. A clutch lever 276, which operates the clutch 60, lies in the path of the projection 272 so that, when the treadle 254 is depressed and the projection 272 moved forwardly, the clutch lever 276 is moved forwardly and the clutch thrown into engagement. This serves to connect the pulley 58 with the driving shaft 53, to start the machine. The treadle may be locked under a catch 278 and the machine will continue to run. When the treadle is released, the spring 274 acts to withdraw the wedge 270, permitting the spring 280 to disengage the clutch and at the same time apply the brake 282 to the driving shaft to stop the machine. For the purpose of positively disengaging the clutch in the event of failure of the spring 280 to operate the clutch lever, a pin 284 projecting from the end of the slide 76 is provided. When the wedge 270 is drawn forwardly, the clutch lever is held out of engagement with the pin 284, but when the wedge moves rearwardly the lever is permitted to move into the path of the pin and, upon the next rearward movement of the slide, the clutch lever will be positively moved rearwardly to disengage the clutch and stop the machine.

In order to stop the machine promptly in the event of failure of the lift transferring mechanism to deposit any lift upon the lift support at the front of the machine at the proper time, the following mechanism is provided. Rocker arms 148 are pivoted upon the bar 18 and carry at their rear ends a rod 150, which extends longitudinally of the machine. Adjustable screws 152, threaded through the rod 150, bear upon the rear ends of the levers 144. One end of the rod 150 is connected by a link 154 to a latch 156 which is, in turn, pivotally connected to the upper end of the treadle rod 158. A lever 286 is arranged to be oscillated by a roll 288 on the back of the worm wheel 64 at each revolution. The nose 290 of the lever 286 normally moves past, and does not engage, the end of the latch 156 as long as the rod 150 is lowered. The timing of the mechanism is such that the nose 290 approaches the latch when a series of lifts should rest upon the shelves 52. If a complete series of lifts is in proper position upon the shelves, each finger 146 will engage a lift and will be supported thereby so that the outer ends of the levers 144 will be elevated and their inner ends depressed, but if a lift should be absent from any of the shelves the corresponding finger 146 will, when the cam 136 is withdrawn from beneath the slide 140, descend until it rests upon the shelf 52. This will cause the inner end of the corresponding lever 144 to be elevated until it engages the screw 152 and lifts the rod 150. The elevation of the rod will raise the free end of the latch 156 until it is in the path of movement of the nose 290. Now, as the lever 286 is oscillated, its nose 290 will engage the latch 156, moving the upper end of the treadle rod 158 forwardly and disengaging the notch 264 from the dog 266. The spring 274 will now draw the wedge slide 270 rearwardly and the machine will be automatically stopped, as heretofore described.

Figure 16:
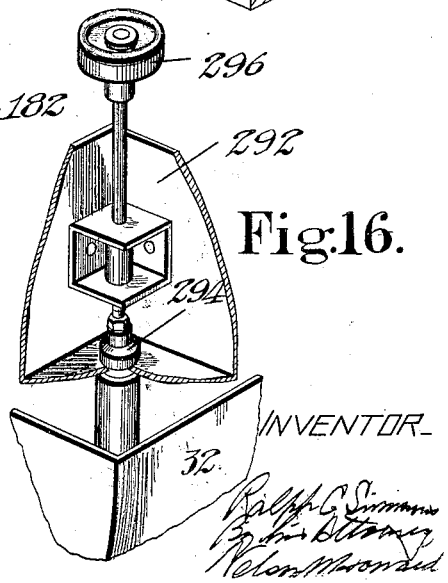
Fig. 16 is a view of a detail of the valve for controlling the supply of paste.

For the purpose of maintaining a desired height of paste in the tank 32 an auxiliary tank 292 is provided. The auxiliary tank may be supplied with paste, as desired, and the paste may then be released and allowed to flow into the main tank in any desired quantity by operating a valve 294 provided with a handle 296, see Figs. 1 and 16.

The operation of the machine is as follows: The magazines 20, or as many of them as are required to contain the number of lifts in the heel to be built, are filled with stacks of heel lifts and the tank 32 is filled with adhesive. The machine is then started by depressing the treadle. As the pushers 84 advance, each of them removes the bottom lift from its corresponding magazine and advances it along a grid 28 over the paste roll 34, where the lift receives a coating of paste upon its lower face. The weight 94, under which the lift passes, keeps it flat and presses it into close contact with the paste roll. As the forward movement of the pushers continues, a complete series of lifts for building a single heel is delivered to and deposited, upon the lift support consisting of the series of shelves 52. At this time the cam rod 120 has moved toward the left, see Fig. 1, and the fingers 146 are elevated to permit the lifts to be deposited upon the shelves. The endless chain lift conveyor is also at this time stationary. Immediately after the lifts are deposited upon the shelves 52 the cam rod 120 is moved toward the right, allowing the fingers 146 to descend until they engage and hold the lifts upon the shelves. While the lifts are thus held, the pushers are separated from the lifts and retracted. As the cam rod 120 begins its return stroke to the left, the cams 136 raise the fingers 146, releasing their holding pressure upon the series of lifts. This stroke of the cam rod also acts through the rack 186, pinion 188, pawl 190 and ratchet 184 to advance the lift assembling fingers 172 one step, viz., the distance between two successive shelves or magazines. As the assembling fingers advance, the lifts upon the respective shelves are pushed off, the first lift being guided to drop upon the table 166, as shown in Fig. 10, and the successive lifts each falling upon the pile which has, at the previous step, been advanced from the preceding station. In this manner a complete series of lifts is removed from the shelves 52 at each step in the movement of the assembling mechanism and a new series of lifts is deposited upon the shelves after each such movement ready to be removed at the next. A number of heels, equal to the number of lifts in a single heel, are thus being built simultaneously, and a complete heel is delivered at each step in the movement of the assembling mechanism, although the said mechanism only moves a distance equal to the spacing between successive lift magazines. After the heel pile has received its top lift from the last magazine in the series it is advanced by the assembling mechanism between the resilient guide fingers 192, where any lack in transverse register of the lifts is approximately corrected, and the heel pile is guided so as properly to enter the space beneath the heel form.

When the conveyor has stopped with a heel pile resting upon the block 208, the plunger 206, carrying the block, is elevated suddenly, driving the heel into the form with a sharp blow, after which the nailing device acts immediately to drive the heel building nail through the aperture 204 into the heel. The plunger 206 now descends and, simultaneously, the ejector 226 drives the finished heel blank out of the form, causing it to drop again upon the block 208 in the path of the assembling fingers. The fingers, in the next step of their movement, move the heel off the block and dump it into the delivery chute 228 from which it is received in a box or other suitable receptacle.

In the event of failure of any lift to be delivered to the shelves 52 at the proper time, the automatic stop mechanism operates as previously described to stop the machine promptly until the error has been corrected and the machine again started by the operator depressing the treadle.

By reason of the unidirectional movement of the lift assembling mechanism and the fact that it is moved only a short distance for each assembling operation, the machine may be run at a high speed, as compared with machines having a reciprocating lift assembling device which must be moved past the entire series of magazines to assemble each heel, and then retracted to initial position before beginning the assembly of the next heel. In addition to the increased speed of operation, the fact that a plurality of heels are being built simultaneously results in a very large production of heels by the machine without undue strain or wear upon the mechanism.

The magazines may be removed for filling and new ones substituted by simply lifting off one magazine and placing another in position, there being no fastenings to loosen or secure and the operation being performed very quickly.

At the end of a day's work the magazines may be lifted off, the auxiliary frame 12 swung into upright position, and the entire machine washed and cleaned with the utmost ease and facility.

Having described my invention, what I claim as new and desire to secure by Letters Patent of the United States is:—

1. In a heel building machine, the combination of a series of lift magazines equal in number to the number of lifts in a complete heel blank, means for simultaneously removing a lift from each of said magazines and depositing all of said lifts in an alined row, and separate means for moving the entire row of said deposited lifts in the direction of their alinement through a distance equal to the spacing between adjacent magazines after each operation of the lift removing and depositing means.

2. In a heel building machine, the combination of a series of lift magazines, lift assembling mechanism having a step-by-step linear movement, and means for removing simultaneously from said magazines a complete series of lifts, sufficient in number to build a complete heel blank, and depositing them in alinement in the line of action of the assembling mechanism after each step of the movement of the latter.

3. In a heel building machine, the combination of a series of heel lift magazines, means for moving heel lifts from the several magazines into positions in which they are in alinement, means for holding the heel lifts in their alined positions, and assembling means that is movable in the direction of the line of heel lifts for assembling lifts in proper register with each other to form heels.

4. In a heel building machine, the combination of a series of lift magazines, separate lift supporting means, means for repeatedly delivering from the magazines to the supporting means a complete series of lifts, sufficient in number to build a complete heel blank, and step-by-step assembling means operating in a path adjacent to said lift supporting means to take, at each step of its movement, one of said complete series of lifts from the supporting means and deposit the lifts of the series upon partially formed piles of lifts accumulated during previous steps of its movement.

5. In a heel building machine, the combination of means for holding a series of stacks of heel lifts, means for removing lifts from the several stacks, supporting means for receiving the lifts thus removed, and assembling means for assembling lifts from the supporting means in proper register with each other to form heels.

6. In a heel building machine, the combination of means for holding a series of stacks of heel lifts, means for simultaneously moving the bottom lifts from the several stacks into positions from which they are afterwards to be assembled, and assembling means for simultaneously moving the positioned lifts and assembling them in proper register with other lifts to form heels.

7. In a heel building machine, the combination of means for supporting a series of stacks of heel lifts, means for removing the bottom lifts from the several stacks, supporting means for receiving the lifts thus removed and means for assembling the lifts in proper register with other lifts to form heels.

8. In a heel building machine, the combination of means for supporting a series of stacks of heel lifts, means for engaging and removing the bottom lifts from the several stacks simultaneously and moving them while under control of said means into assembling positions, and means for assembling the lifts in proper register with other lifts to form heels.

9. In a heel building machine, the combination of a series of lift magazines, a lift support comprising a series of shelves arranged in a row, means for removing a series of lifts from the several magazines and depositing them upon the shelves, and means for removing lifts from the shelves and assembling them in proper register with each other to form heels.

10. In a heel building machine, the combination of a series of magazines for holding stacks of heel lifts, stationary means for supporting series of heel lifts when separated from the stacks, assembling means, in cooperative relation to the lift supporting means, for collecting the series of lifts from the supporting means and superposing them in heel form, and mechanism for effecting a step-by-step operative movement of the assembling means in one direction only.

11. A heel machine having, in combination, a conveyor having a series of movable members constructed and arranged to engage and advance a corresponding series of separate piles of heel lifts, means for moving the conveyor in the same direction intermittently, a single alining means located in cooperative relation to the path of movement of the heel piles to engage the piles successively and aline the lifts thereof, and means for securing the lifts together.

12. In a heel building machine, the combination of means for supporting a series of stacks of heel lifts, means for removing a series of lifts from the several stacks, a heel form, and means for collecting the series of lifts in piles and placing them in the heel form.

13. In a heel building machine, the combination of a series of heel lift magazines, a series of lift supporting shelves adjacent to the magazines, means for removing a series of lifts from the magazines and depositing them upon the shelves, movable mechanism for collecting lifts from the shelves, and means for advancing the collecting mechanism a distance equal to the spacing of the shelves after each operation of the removing and depositing mechanism.

14. A heel machine having, in combination, an endless conveyor for advancing a series of heel piles disposed in co-operative relation therewith, means for moving the endless conveyor progressively step-by-step in one direction, and guiding or positioning means for engaging each pile laterally thereof as it is moved past for alining said piles longitudinally relatively to the conveyor.

15. A heel machine having, in combination, a movable, endless conveyor having a plurality of sections for severally receiving and advancing a series of separate heel piles, each of said sections having a heel breast engaging member, and single means, engaging each pile laterally thereof as it is moved past said means, for alining the piles longitudinally and positioning them against the breast engaging members.

16. In a heel building machine, the combination of a row of magazines adapted to contain heel lifts, a plurality of supports for heel lifts, means for simultaneously moving a plurality of heel lifts from the magazines and depositing them in line on the supports, an assembling means for advancing the heel lifts, and guides for directing the lifts as they are moved from the supports by the assembling means.

17. In a heel building machine, the combination of means for supporting a stack of heel lifts, a lift support, means for removing a lift from the stack and depositing it upon the support, means movable into engagement with the lift for holding it upon the support and assembling means for moving the lift from the support into proper register with other lifts to form a heel.

18. In a heel building machine, the combination of means for supporting a series of stacks of heel lifts, a lift support, means for removing a series of lifts from the several stacks and depositing them upon the support, means for engaging the several lifts and holding them upon the support, and means for removing lifts from the support and assembling them to form heels.

19. In a heel building machine, the combination of means for holding a series of stacks of heel lifts, supports arranged to receive heel lifts from said stacks, means for moving heel lifts from said stacks to said supports, means for holding the heel lifts on said supports, and assembling means for moving the heel lifts from the supports.

20. In a heel building machine, the combination of a heel lift magazine, lift pasting mechanism, a lift support adjacent to the magazine, means for removing a lift from the magazine and presenting it successively to the pasting mechanism and the lift support, and means movable into engagement with the pasted lift for holding it upon the lift support.

21. In a heel building machine, the combination of a heel lift magazine, a paste roll adjacent to the magazine, a lift support adjacent to the paste roll, a pusher arranged to push a lift from the magazine past the paste roll to the lift support, and means movable into engagement with the pasted lift for holding it upon the support while the pusher is separated from it.

22. In a heel building machine, the combination of a heel lift magazine, a pasting device adjacent to the magazine, a pusher arranged to push a lift from the magazine past the pasting device to a predetermined position, and means movable into engagement with the pasted lift for preventing adhesion of the pasted lift to the pusher when the latter is retracted.

23. In a heel building machine, the combination of means for supporting a series of stacks of heel lifts in superposed, horizontal arrangement, a lift assembling mechanism mounted for unidirectional movement in a path adjacent to the stacks, the said mechanism being provided with a spaced series of assembling devices, and means for moving the assembling mechanism repeatedly through a distance equal to the spacing of the said devices.

24. In a heel building machine, the combination of means for supporting a series of stacks of heel lifts in superposed, horizontal arrangement, a lift assembling mechanism mounted for unidirectional movement in a path adjacent to the stacks, the said mechanism being provided with a plurality of spaced assembling devices, and means for advancing the assembling mechanism intermittently through distances equal to the spacing of the stacks.

25. In a heel building machine, the combination of means for supporting a series of stacks of heel lifts in superposed horizontal arrangement, a lift assembling mechanism mounted for unidirectional movement in a path adjacent to the stacks, the said mechanism being provided with a series of assembling devices spaced apart equally with the spacing of the stacks, and means for advancing the assembling mechanism step by step through distances equal to the spacing of the stacks.

26. In a heel assembling machine, the combination of means for supporting a series of stacks of heel lifts, a lift assembling mechanism mounted for unidirectional movement in a path adjacent to the stacks, the said mechanism being provided with a series of assembling devices spaced apart equally with the spacing of the stacks, means for advancing the assembling mechanism step by step through distances equal to the spacing of the stacks, and means for engaging and removing a series of lifts from the stacks and presenting them to the assembling mechanism between each two steps of movement of the latter, whereby a plurality of heels are simultaneously in process of being built.

27. In a heel building machine, the combination of means for supporting a series of stacks of heel lifts, means for simultaneously removing from the stacks a number of heel lifts sufficient to form a complete heel and placing them in assembling positions, lift assembling mechanism comprising a series of lift engaging and advancing devices spaced apart equally with the spacing of the stacks, and means for advancing all the lift engaging devices past the entire series of stacks.

28. In a heel building machine, the combination of lift feeding mechanism, lift pasting mechanism located in the path of movement of the feeding mechanism, and a weight having a substantially flat lift engaging face, located in the path of movement of the feeding mechanism, adjacent to the pasting mechanism, for pressing a lift into engagement with the pasting mechanism.

29. In a heel building machine, the combination of lift feeding mechanism, lift pasting mechanism cooperatively related to the feeding mechanism, and a weight having a substantially flat lift engaging face, mounted for free vertical movement adjacent to the pasting mechanism in the path of movement of the feeding mechanism for pressing a lift into engagement with the pasting mechanism.

30. In a heel building machine, the combination of lift feeding mechanism, lift pasting mechanism located in the path of movement of the feeding mechanism and adapted to deliver paste to heel lifts as they are fed by the feeding mechanism, and a grid located in the path of movement of the feeding mechanism beyond the pasting mechanism for receiving pasted lifts.

31. In a heel building machine, the combination of a lift supporting grid comprising a plurality of space sections, means movable along the grid for feeding lifts along the grid, and lift pasting mechanism comprising paste applying means operable between the sections of the grid to apply paste to a lift as it is fed along the grid.

32. In a heel building machine, the combination of a lift supporting grid comprising a plurality of spaced sections, means movable along the grid for feeding lifts along the grid, and lift pasting mechanism comprising a paste roll having paste applying portions passing between the sections of the grid to apply paste to a lift as it is fed along the grid.

33. In a heel building machine, the combination of a lift feeding pusher, a paste roll located in the path of the pusher, means for advancing the pusher to feed a lift across the paste roll, and a scraper for removing adherent paste from the pusher upon its return movement.

34. In a heel building machine, lift assembling mechanism comprising traveling chains, lift assembling devices upon the chains, said devices being mounted to yield upon encountering excessive resistance to their movement, and means for supporting lifts in the path of movement of said devices.

35. In a heel building machine, the combination of means for supporting a series of stacks of heel lifts, a series of lift supports, means for removing series of lifts from the stacks and delivering them to the supports, a lift assembling device, and means for causing the assembling device to engage successively lifts upon the supports and move them, one under another, into proper register with each other to form heels.

36. In a heel building machine, the combination of means for supporting a series of stacks of heel lifts, a series of slotted lift supports, means for removing series of lifts from the stacks and depositing them upon the supports, a series of lift assembling devices movable through the slots in the supports, and means for advancing said devices to engage and remove successive series of lifts from the supports and assemble them in proper register with each other to form a series of heels.

37. In a heel building machine, the combination of means for collecting a pile of lifts to form a heel, a heel form, and means for removing the heel from the collecting device and placing it in the heel form.

38. In a heel building machine, the combination of heel lift assembling mechanism comprising a plurality of spaced members, a heel form adjacent to the path of movement of the assembling mechanism, a plunger adjacent to the heel form, and means for moving the plunger between the spaced members of the lift assembling mechanism to remove a heel from said mechanism and insert it in the form.

39. In a heel building machine, the combination of heel lift assembling mechanism comprising chains and lift assembling devices carried by the chains, a heel form adjacent to the path of movement of said devices, a plunger movable between the chains to remove a heel therefrom and insert it in the form, and means for dislodging the heel from the form and replacing it in the path of the assembling devices.

40. In a heel building machine, the combination of a heel form having a base provided with an aperture of substantial size, and nail driving mechanism having an adjustable nozzle co-operatively related to said aperture to permit variation of the point at which a nail is driven through the aperture into a heel in the form.

41. In a heel building machine, the combination of a heel form having a base provided with an aperture of substantial size, nail driving mechanism having a nozzle adjacent to said aperture and adjustable transversely relatively thereto, and a plunger, provided with a nail clinching surface, for forcing a heel into the form and holding it while a nail is driven.

42. In a heel building machine, the combination of a lift support, mechanism for depositing a row of lifts upon the support, means for engaging and operating upon the lifts, and mechanism for stopping the operation of said means upon failure of the depositing mechanism to deliver a complete row of lifts.

43. In a heel building machine, the combination of a lift support, mechanism for depositing a row of lifts upon the support, lift assembling means for collecting the lifts from the support, and means for stopping the operation of the machine upon failure of the depositing mechanism to deliver a complete row of lifts.

44. In a heel building machine, the combination of a lift support, mechanism for depositing a series of lifts upon the support, a series of feelers for engaging the individual lifts at predetermined times, and means controlled by the individual feelers for stopping the machine upon failure of any feeler to find a lift in position to be engaged by it at said predetermined times.

45. In a heel building machine, a heel form comprising a plurality of heel engaging jaws freely movable radially inwardly of the form and held positively against outward movement from their normal operative positions.

46. In a heel building machine, a heel form comprising a base, and a plurality of heel engaging jaws mounted in the base and freely removable therefrom inwardly of the form.

47. In a heel building machine, an adjustable heel form comprising a base, a plurality of heel engaging jaws mounted in the base and freely removable therefrom inwardly of the form, and adjustable means for holding the jaws positively against outward movement from their normal operative positions.

48. In a heel building machine, an adjustable form comprising a base, a plurality of heel engaging jaws having radial shanks slidably mounted in the base, said shanks being freely removable from their mounting inwardly of the form, adjusting screws in the outer ends of the shanks, and stationary stops arranged for engagement by the screws to prevent outward movement of the jaws from their normal operative positions.

49. In a heel building machine, the combination of a main frame, driving mechanism mounted in the said frame, an auxiliary frame, and heel lift storing and controlling devices mounted in the auxiliary frame, the frames being connected in such a way as to permit the auxiliary frame to be removed from operative relation to the main frame to afford access to the mechanism in the latter.

50. In a heel building machine, the combination of main and auxiliary frames carrying heel lift controlling and assembling devices in co-operative relation, the frames being hinged together to permit the auxiliary frame to be swung upwardly to afford access to the mechanism in the main frame.

51. In a heel building machine, the combination of a main frame, heel lift pasting and assembling mechanism mounted in said frame, an auxiliary frame superposed upon the main frame, heel lift storing and controlling devices mounted in the auxiliary frame in co-operative relation to the lift pasting and assembling mechanism, and hinged connections between the frames, permitting the auxiliary frame to be swung upwardly to afford access to the lift pasting and assembling mechanism.

52. In a heel machine, the combination of an endless carrier having a series of spaced fingers for engaging and advancing a series of separate heel piles and adding lifts to the piles as they are advanced, and nailing mechanism located in co-operative relation to the path of movement of the piles and operative intermittently to nail together the lifts of successive piles.

53. In a heel machine, the combination of an intermittently movable endless carrier having a series of spaced fingers for engaging and advancing a series of separate heel piles and adding lifts to the piles as they are advanced, and nailing mechanism located in co-operative relation to the path of movement of the piles and operative during periods of rest of said carrier to nail together the lifts of successive piles.

54. In a heel machine, the combination of an endless carrier, a lift assembling and advancing device, mechanism adjacent to the path of movement of said device for nailing together a pile of assembled heel lifts, and means for removing a pile of heel lifts from said device, presenting it for the action of said mechanism, and returning it to said device.

In testimony whereof I have signed my name to this specification.

RALPH C. SIMMONS.